(12) United States Patent  
Xiong et al.

(10) Patent No.: US 9,755,909 B2  
(45) Date of Patent: Sep. 5, 2017

(54) METHOD, DEVICE AND SYSTEM FOR CONTROLLING NETWORK PATH

(71) Applicant: Huawei Technologies Co., Ltd., Shenzhen, Guangdong (CN)

(72) Inventors: Yi Xiong, Guangdong (CN); Xiaoqian Wu, Guangdong (CN); Changjiang Yan, Guangdong (CN); Jiehui Hu, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 146 days.

(21) Appl. No.: 14/575,386

(22) Filed: Dec. 18, 2014

(65) Prior Publication Data

US 2015/0146571 A1    May 28, 2015

Related U.S. Application Data

(63) Continuation of application No. PCT/CN2012/077752, filed on Jun. 28, 2012.

(51) Int. Cl.
*H04L 12/28* (2006.01)
*H04L 12/24* (2006.01)
*H04W 24/02* (2009.01)
*H04W 40/00* (2009.01)

(52) U.S. Cl.
CPC ............ *H04L 41/12* (2013.01); *H04W 24/02* (2013.01); *H04W 40/00* (2013.01)

(58) Field of Classification Search
None
See application file for complete search history.

(56) References Cited

U.S. PATENT DOCUMENTS

2002/0001290 A1    1/2002  Bender et al.
2002/0075941 A1*   6/2002  Souissi ............... H04B 1/715
                                               375/133

(Continued)

FOREIGN PATENT DOCUMENTS

CN          1859614 A       11/2006
CN        101155134 A        4/2008

(Continued)

*Primary Examiner* — Zewdu A Beyen
(74) *Attorney, Agent, or Firm* — Leydig, Voit & Mayer, Ltd.

(57) ABSTRACT

Embodiments of the present invention provide a method, a device, and a system for controlling a network path, where the method includes: the first control device generates path information for a first AP according to network topology information, and generates first forwarding information for the first AP according to acquired forwarding resource information of the first AP and the path information, and sends the first forwarding information to the first AP; the first control device determines that a second AP which is not managed by the first control device is included in the path information, sends the path information to a second control device for managing the second AP, so that the second control device generates second forwarding information for the second AP according to the path information and the acquired forwarding resource information of the second AP, and sends the second forwarding information to the second AP.

15 Claims, 5 Drawing Sheets

(56) References Cited

U.S. PATENT DOCUMENTS

| | | | | |
|---|---|---|---|---|
| 2003/0065784 A1* | 4/2003 | Herrod | ................. | H04W 28/18 |
| | | | | 709/227 |
| 2004/0215819 A1 | 10/2004 | Tsuruoka et al. | | |
| 2010/0111093 A1* | 5/2010 | Satterlee | ............ | H04L 12/4641 |
| | | | | 370/401 |
| 2011/0103284 A1* | 5/2011 | Gundavelli | ............ | H04L 12/18 |
| | | | | 370/312 |
| 2013/0028163 A1* | 1/2013 | Hsiao | ..................... | H04W 4/06 |
| | | | | 370/312 |

FOREIGN PATENT DOCUMENTS

| | | |
|---|---|---|
| CN | 101442442 A | 5/2009 |
| CN | 101453405 A | 6/2009 |
| CN | 101599893 A | 12/2009 |
| CN | 101772109 A | 7/2010 |
| CN | 102065522 A | 5/2011 |
| CN | 102511151 A | 6/2012 |
| EP | 1881660 A1 | 1/2008 |
| EP | 2608459 A2 | 6/2013 |
| JP | 2004356953 A | 12/2004 |
| JP | 2012044583 A | 3/2012 |
| WO | WO 2012070173 A1 | 5/2012 |

\* cited by examiner

METHOD, DEVICE AND SYSTEM FOR CONTROLLING NETWORK PATH

CROSS-REFERENCE TO RELATED APPLICATIONS

This application is a continuation of International Patent Application No. PCT/CN2012/077752, filed Jun. 28, 2012, which is hereby incorporated by reference in its entirety.

TECHNICAL FIELD

The present invention relates to the communication technology and, in particular, to a method, a device, and a system for controlling a network path.

BACKGROUND

In the prior art, communication between network devices are typically achieved by multiple routers and/or switches through forwarding packets. Generally, each router or switch is provided with a control plane, a management plane and a data plane. A user manages the router or the switch via the management plane, the control plane operates various forwarding protocols, computes paths, generates forwarding entries, and issues the forwarding entries to the data plane, and the data plane forwards the packet according to the forwarding entries.

Since each router or switch in the network performs operations of the above three planes, when a network protocol is updated, each router or switch needs to be configured and maintained, then manageability of a complex network is poor.

SUMMARY

Embodiments of the present invention provide a method, a device, and a system for controlling a network path, so as to achieve centralization of a control plane, and improve manageability of the network.

An embodiment of the present invention provides a method for controlling a network path, including:

generating, by a first control device, path information for a first AP according to network topology information, and generating first forwarding information for the first AP according to acquired forwarding resource information of the first AP and the path information, and sending the first forwarding information to the first AP;

determining, by the first control device, that a second AP which is not managed by the first control device is included in the path information, sending the path information to a second control device for managing the second AP, so that the second control device generates second forwarding information for the second AP according to the path information and acquired forwarding resource information of the second AP, and sending the second forwarding information to the second AP.

An embodiment of the present invention provides a method for controlling a network path, including:

sending, by an access point (AP), forwarding resource information to a first control device and a second control device, respectively;

receiving, by the AP, first forwarding information sent by the first control device and third forwarding information sent by the second control device;

determining, by the AP, valid forwarding information according to the first forwarding information and the third forwarding information, and forwarding a received packet according to the valid forwarding information.

Optionally, the first forwarding information includes a first priority that is delivered by the first control device to the AP; the third forwarding information includes a third priority that is delivered by the second control device to the AP; and the determining, by the AP, the valid forwarding information according to the first forwarding information and the third forwarding information specifically includes:

selecting, by the AP, the first forwarding information as the valid forwarding information, when the first priority is higher than the third priority.

Optionally, the determining, by the AP, the valid forwarding information according to the first forwarding information and the third forwarding information specifically includes: selecting, by the AP, one of the first forwarding information and the third forwarding information as the valid forwarding information, according to a preset policy.

Optionally, the sending, by the AP the forwarding resource information to the first control device and the second control device, respectively, includes:

sending, by the AP, the forwarding resource information to the first control device, according to a received first forwarding resource information acquiring request which is sent by the first control device;

sending, by the AP, the forwarding resource information to the second control device, according to a received second forwarding resource information acquiring request which is sent by the second control device.

An embodiment of the present invention provides a first control device, including:

a first processing unit, configured to generate path information for a first AP according to network topology information, and generate first forwarding information for the first AP according to acquired forwarding resource information of the first AP and the path information, and send the first forwarding information to the first AP;

a second processing unit, configured to determine that a second AP which is not managed by the first control device is included in the path information, send the path information to a second control device for managing the second AP, so that the second control device generates second forwarding information for the second AP according to the path information and acquired forwarding resource information of the second AP, and send the second forwarding information to the second AP.

An embodiment of the present invention provides an access point, including:

a sending unit, configured to send forwarding resource information to a first control device and a second control device, respectively;

a second receiving unit, configured to receive, first forwarding information sent by the first control device and third forwarding information sent by the second control device;

a forwarding unit, configured to determine, valid forwarding information according to the first forwarding information and the third forwarding information, and forward a received packet according to the valid forwarding information.

An embodiment of the present invention provides a system for controlling a network path, including:

a first control device, a second control device, a first access point (AP) and a second AP;

where the first control device is configured to generate path information for a first AP according to network topology information, and generate first forwarding information for the first AP according to acquired forwarding resource information of the first AP and the path information, and send the first forwarding information to the first AP, determine that a second AP which is not managed by the first control device is included in the path information, send the path information to the second control device for managing the second AP, so that the second control device generates second forwarding information for the second AP according to the path information and acquired forwarding resource information of the second AP, and sends the second forwarding information to the second AP;

the first AP is configured to send the forwarding resource information to the first control device and the second control device, respectively, receive the first forwarding information sent by the first control device and the third forwarding information sent by the second control device, determine, valid forwarding information according to the first forwarding information and the third forwarding information, and forward a received packet according to the valid forwarding information.

Seen from the above technical solutions, in the method, the device, and the system for controlling a network path provided in the embodiments of the present invention, the first control device generates the path information for the first AP according to the network topology information, and generates the first forwarding information for the first AP according to the acquired forwarding resource information of the first AP and the path information, sends the first forwarding information to the first AP, determines that the second AP which is not managed by the first control device is included in the path information, then sends the path information to the second control device for managing the second AP, so that the second control device generates the second forwarding information for the second AP according to the path information and the acquired forwarding resource information of the second AP, and sends the second forwarding information to the second AP. According to the setting of the first control device, a control plane of the first AP is centralized in the first control device, the first control device performs path computation for the first AP which is managed by the first control device, generates first forwarding information and issues the first forwarding information to the first AP, and the first AP doesn't perform path computation but only forwards packets according to the received first forwarding information. Moreover, according to the setting of the second control device, the second control device can cooperate with the first control device to generate and issue the second forwarding information of the second AP which is not managed by the first control device. Therefore, performing configuration and maintaining for each AP in a network can be avoided, the network structure is simplified, and the manageability of the network is improved.

DESCRIPTION OF EMBODIMENTS

In order to make the objects, technical solutions, and advantages of the embodiments of the present invention more comprehensible, the technical solutions in the embodiments of the present invention are hereinafter described clearly and completely with reference to the accompanying drawings in embodiments of the present invention. Obviously, the embodiments described here are merely part of embodiments of the present invention and not all of the embodiments. All other embodiments obtained by persons skilled in the art on the basis of the embodiments described in the present invention without any creative efforts all fall within the scope of the invention.

Figure 1:
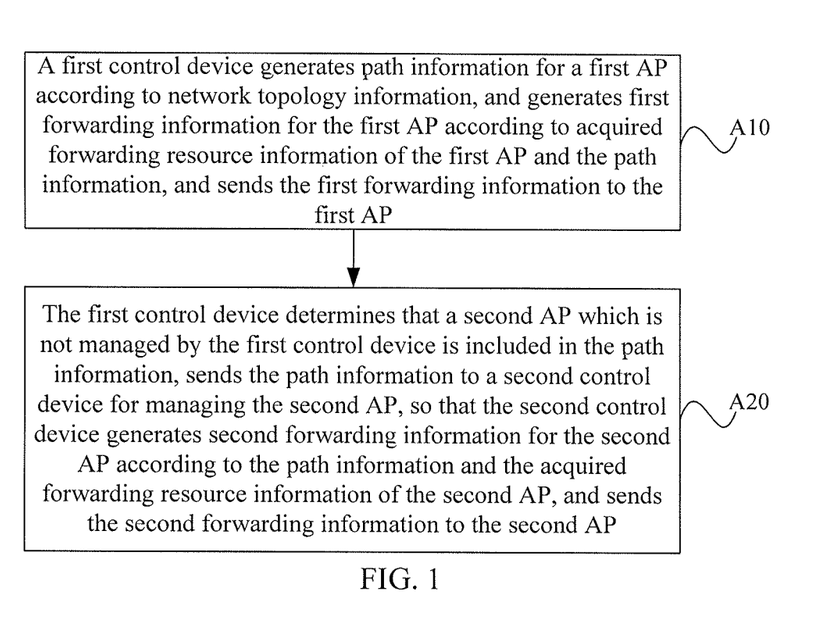
FIG. 1 is a flow chart of a method for controlling a network path according to an embodiment of the present invention.

FIG. 1 is a flow chart of a method for controlling a network path according to an embodiment of the present invention. As shown in FIG. 1, the method for controlling the network path provided in this embodiment specifically can be applied to a routing control process of multiple routers or switches in the network. The method for controlling a network path provided in this embodiment specifically includes:

Step A10: A first control device generates path information for a first AP according to network topology information, and generates first forwarding information for the first AP according to acquired forwarding resource information of the first AP and the path information, and sends the first forwarding information to the first AP;

Step A20: The first control device determines that a second AP which is not managed by the first control device is included in the path information, sends the path information to a second control device for managing the second AP, so that the second control device generates second forwarding information for the second AP according to the path information and the acquired forwarding resource information of the second AP, and sends the second forwarding information to the second AP.

Specifically, multiple routers or switches are set between network devices which communicate with each other, so as to forward the packets exchanged between the network devices. For example, a radio access network (Radio Access Network, RAN for short) set between a base station and a base station controller is provided with multiple routers or switches, so as to achieve communication between the base station and the base station controller. Of course, this embodiment only describes one application scenario, the method for controlling the network path provided in this embodiment further can also be applied to other application scenarios that multiple routers or switches are used to exchange packets so as to achieve communication between network devices.

At least one of the plurality of routers or switches in the network may be set to be a first control device in advance, at least one of the plurality of routers or switches may be set to be a second control device, while other routers or switches are set to be APs, and some APs are set to be managed by the first control device while other APs are set to be managed by the second control device. When the router or switch in the network serves as the first control device or the second control device, besides functions of a control plane and a management plane, a function of a data plane should also be achieved by the first control device or the second control device. A server may be further set as the first control device or the second control device, when the server serves as the first control device or the second control device, the first control device or the second control device only needs to achieve functions of a control plane and a management plane, without a function of a data plane. The functions of a control plane specifically are to perform path computation and generate forwarding information, the function of a management plane specifically is a user management interface, and the function of a data plane specifically is to forward packets according to the forwarding information issued by the control plane.

There are several implementations of the setting process:

In one implementation, the router or the switch is provided with a configuration interface, the router or the switch can set itself to be a first control device according to first configuration information input by the user via the configuration interface, and know which AP is managed by the router or the switch itself according to the first configuration information. The first control device can actively detect whether the AP to be managed is in service, and establish a connection with the AP to achieve management of the AP.

In another implementation, the AP is also provided with a configuration interface, the AP can set itself to be an AP according to second configuration information input by the user via the configuration interface, and know a first control device which manages the AP itself according to the second configuration information. The AP can actively detect whether the first control device which manages the AP itself is in service, and establish a connection with the first control device to be under the control of the first control device.

In yet another implementation, the AP can also know first control devices present in the network, and select a first control device by which the AP itself is controlled. The AP selects the first control device, actively detects whether the first control device which manages itself is in service, and establishes a connection with the first control device to be under the control of the first control device.

A manner for establishing the connection between the first control device and the AP may use an existing network protocol, for example, the first control device and the AP are respectively configured with IP addresses, a TCP/IP connection is established between the first control device and the AP, and an reachable IP route between the first control device and the AP can be achieved via an intermediate system to intermediate system (Intermediate System to Intermediate System, ISIS for short) protocol. There may be a layer-2 network between the first control device and the AP, and the connection is established by sending an ETH frame. The first control device and the AP may be classified into a same virtual local area network (Virtual Local Area Network, VLAN for short), and a layer-2 management network is established to achieve the communication between the first control device and the AP.

The process for setting the second control device and the process for setting the AP managed by the second control device may specifically refer to the specific description of the process for setting the first control device, and no further details are given here.

Among APs managed by the first control device, the first control device is a master control device of part of the APs, and the first control device is a standby control device of the remaining APs. For ease of description, an AP taking the first control device as a master control device is called a first AP in this embodiment, and an AP taking the first control device as a standby control device is called a third AP in this embodiment. The first control device performs path computation and generates forwarding information for the first AP, and the first control device generates only forwarding information for the third AP, without performing path computation for the third AP. The second control device may be set as a standby control device for managing the first AP, and the other control device may also be set as a standby control device for managing the first AP. Preferably, in a network deployment, if path information generated when the first control device performs path computation for the first AP includes a second AP which is not managed by the first control device, the control device for managing the second AP shall manage at least one AP managed by the first control device at the same time. Similarly, the third AP also has a corresponding master control device.

In practical applications, the first control device may be a master control device of an AP, and may also be a standby control device of another AP. The second control device may be a standby control device of an AP, and may also be a master control device of another AP. That is, a network may be set multiple control devices, each control device is set a role, and in terms of the same AP, one control device has only one role, which may be either a master control device or a standby control device. One AP may have multiple master control devices, and may also have multiple standby control devices. Preferably, one AP has one master control device, so as to prevent co-routed paths appearing in the computed path information.

For example, the master control device of the first AP is the first control device, the standby control device of the first AP is the second control device, when the first control device has faults or is upgraded, the second control device takes over the job of the first control device, so that a service is uninterrupted, thereby improving the network reliability, even if the first control device fails to support an in-service software upgrade (In-Service Software Upgrade, ISSU for short), a whole network service can still be uninterrupted during upgrading the first control device.

The first control device may know network topology information in advance, and generate path information for the first AP according to the network topology information, where the path information may specifically include bidirectional path information between the first control device and the first AP and/or bidirectional path information between the second control device and the first AP. The first control device may also acquire forwarding resource information of the first AP in advance, where the forwarding resource information of the first AP is specifically used for indicating the case of the forwarding resource of the first AP, and the forwarding resource information may specifically include a label space, a MAC (Media Access Control, media access control) address and port information of the first AP and so on. The method for acquiring the forwarding resource information of the first AP may be that the first control device actively requests the forwarding resource information of the first AP from the first AP, or the first AP actively reports the forwarding resource information of the first AP to the first control device. The first control device generates first forwarding information for the first AP according to the forwarding resource information of the first AP and the path information, where the number of first forwarding information may specifically be multiple. When packet forwarding in the network is an MPLS (Multi-Protocol Label Switching, multi-protocol label switching) forwarding, the first forwarding information may specifically include information such as incoming label, ingress port, outgoing label, egress port and label operation types. When packet forwarding in the network is layer-2 forwarding, the first forwarding information may specifically include information such as VLAN, ingress port, MAC address, egress port and VLAN operation types.

The first control device sends the first forwarding information to the first AP, when the first forwarding information sent to the first AP are multiple, the first AP may determine valid forwarding information according to the multiple first forwarding information, and perform packet forwarding according to the valid forwarding information. Specifically, a priority of the first forwarding information may be configured in the first control device in advance, and then the priority is carried in the first forwarding information and issued to the first AP, so that the first AP can determine the valid forwarding information according to the priority. The first control device may also select first forwarding information and send it to the first AP.

When the path information generated by the first control device for the first AP includes a third AP managed by the first control device, the first control device may acquire forwarding resource information of the third AP in advance, generate forwarding information of the third AP according to the path information and the forwarding resource information of the third AP, and send the forwarding information of the third AP to the third AP. The method for acquiring the forwarding resource information of the third AP may be that the first control device actively requests the forwarding resource information of the third AP from the third AP, or the third AP actively reports the forwarding resource information of the third AP to the first control device.

When the path information generated by the first control device for the first AP includes a second AP which is not managed by the first control device, the path information is sent to the second control device for managing the second AP. The second control device for managing the second AP may acquire forwarding resource information of the second AP in advance, and the second control device may generate second forwarding information of the second AP according to the received path information and the forwarding resource information of the second AP, and send the second forwarding information to the second AP. The method for acquiring the forwarding resource information of the second AP may be that the first control device actively requests the forwarding resource information of the second AP from the second AP, or the second AP actively reports the forwarding resource information of the second AP to the first control device.

Specifically, at least one of standby control devices of the first AP managed by the first control device is the second control device, the first control device can know the second control device, and synchronize the path information generated for the first AP to the second control device. The first control device synchronizes the path information to the second control device, when the first control device has faults or is upgraded and the second control device takes over the job of the first control device, the second control device may directly perform subsequent job according to the path information, thereby guaranteeing an uninterrupted service.

The first control device may know the second control device of the first AP in many ways, for example, the first control device may know information of a standby control device of the first AP which is master controlled by the first control device according to first configuration information, i.e., determine the second control device. The first AP may also know information of a standby control device of the first AP according to the second configuration information, and report the information of the standby control device to the first control device, so that the first control device can know the second control device. The first control device sends the path information generated for the first AP to the second control device. The first control device may connect to the second control device via an IP, the first control device may also connect to the second control device via a layer-2 connection. The second control device may also be a master control device of another AP, similarly, the second control device generates path information for an AP which is master controlled by the second control device, generates and issues forwarding information corresponding to the AP which is master controlled by the second control device, according to the path information and the acquired forwarding resource information of the AP which is master controlled by the second control device.

In the method for controlling a network path provided in this embodiment, the first control device generates the path information for the first AP according to the network topology information, and generates the first forwarding information for the first AP according to the acquired forwarding resource information and the path information of the first AP, sends the first forwarding information to the first AP, determines that the second AP which is not managed by the first control device is included in the path information, then sends the path information to the second control device for managing the second AP, so that the second control device generates the second forwarding information for the second AP according to the path information and the acquired forwarding resource information of the second AP, and sends the second forwarding information to the second AP. According to the setting of the first control device, a control plane of the first AP is centralized in the first control device, the first control device performs path computation for the first AP which is managed by the first control device, generates first forwarding information and issues the first forwarding information to the first AP, and the first AP doesn't perform path computation but only forwards packets according to the received first forwarding information. Moreover, according to the setting of the second control device, the second control device can cooperate with the first control device to generate and issue the second forwarding information of the second AP which is not managed by the first control device. Therefore, performing configuration and maintaining for each AP in a network can be avoided, the network structure is simplified, and the manageability of the network is improved.

Figure 2:
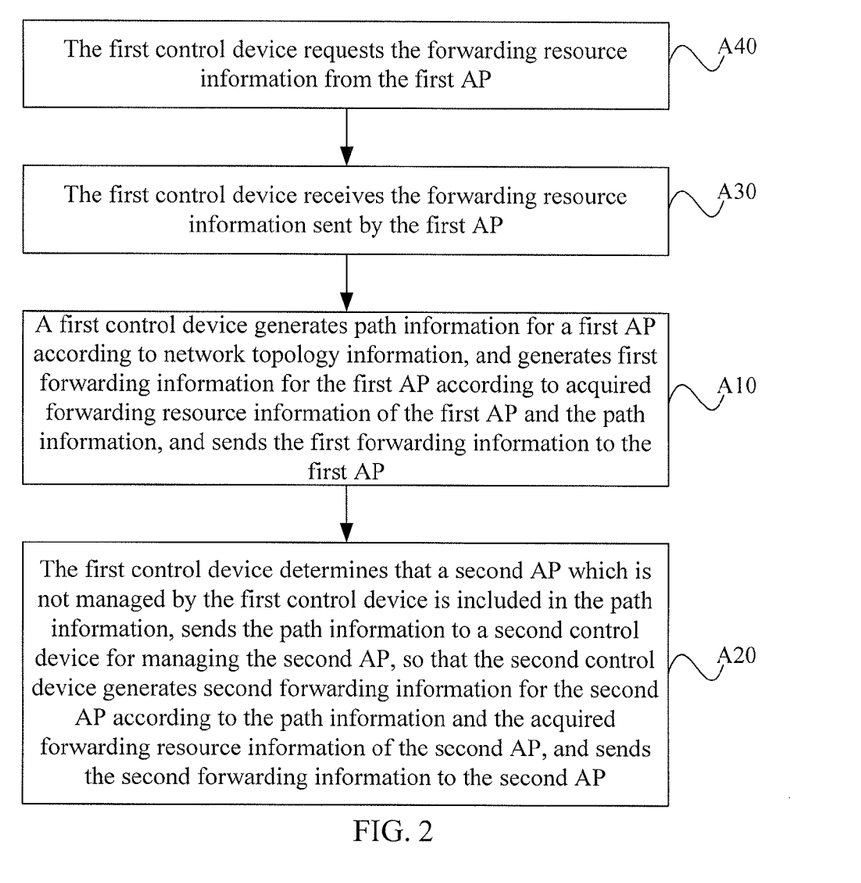
FIG. 2 is a flow chart of a method for controlling a network path according to another embodiment of the present invention.

FIG. 2 is a flow chart of a method for controlling a network path according to another embodiment of the present invention. As shown in FIG. 2, in this embodiment, determining, by the first control device, that the second AP which is not managed by the first control device is included in the path information, which is in Step A20, may specifically include:

the first control device determines that the second AP which is not managed by the first control device is included in the path information, when the second AP is included in the path information and the first control device has no forwarding resource information of the second AP.

Specifically, the first control device may acquire forwarding resource information of an AP managed by the first control device itself in advance, when the path information generated by the first control device for the first AP includes the second AP, and the first control device has no forwarding resource information of the second AP, then the first control device may know that the second AP is not managed by the first control device.

In this embodiment, the path information may include bidirectional path information between the first control device and the first AP and/or bidirectional path information between the second control device and the first AP.

Specifically, the bidirectional path information between the first control device and the first AP may be used for achieving link protection and the bidirectional path information between the second control device and the first A may be used for achieving node protection.

In this embodiment, before the first control device generates the path information for the first AP according to network topology information in Step A10, the method may further include:

Step A30: The first control device receives the forwarding resource information sent by the first AP.

Specifically, the first AP may know that it is under the control of the first control device according to second configuration information, and send forwarding resource information of the first AP to the first control device, and the first control device receives the forwarding resource information sent by the first AP. The first control device may also know the first AP managed by the first control device according to first configuration information, and request forwarding resource information of the first AP from the first AP, the first AP sends the forwarding resource information of the first AP to the first control device, and the first control device receives the forwarding resource information sent by the first AP.

In this embodiment, before the first control device receives the forwarding resource information sent by the first AP, the method may further include:

Step A40: The first control device requests the forwarding resource information from the first AP.

In practical applications, when the first control device and the second control device are the master control device and the standby control device of the first AP, respectively, the first AP sends forwarding resource information to the first control device and the second control device respectively, and the forwarding resource information sent by the first AP shall avoid conflict of resources. Taking a label space in forwarding resource information as an example, a label space in forwarding resource information sent by the first AP to the first control device does not overlap with a label space in forwarding resource information sent to the second control device. The first control device generates forwarding information for the first AP, and the second control device also generates forwarding information for the first AP, thus the first AP will respectively receives forwarding information sent by the first control device and forwarding information sent by the second control device, where forwarding information may carry an identification of a control device sending the forwarding information, then the AP may first select forwarding information sent by a certain control device as valid forwarding information according to its own policy or user configuration, and guide packet forwarding according to the valid forwarding information.

When the first control device manages a third AP, but only serves as a standby control device of the third AP, the first control device may also receive path information synchronized by the master control device of the third AP and generated for the third AP, and the first control device may generate forwarding information for the third AP according to the path information and forwarding resource information of the third AP.

Figure 3:
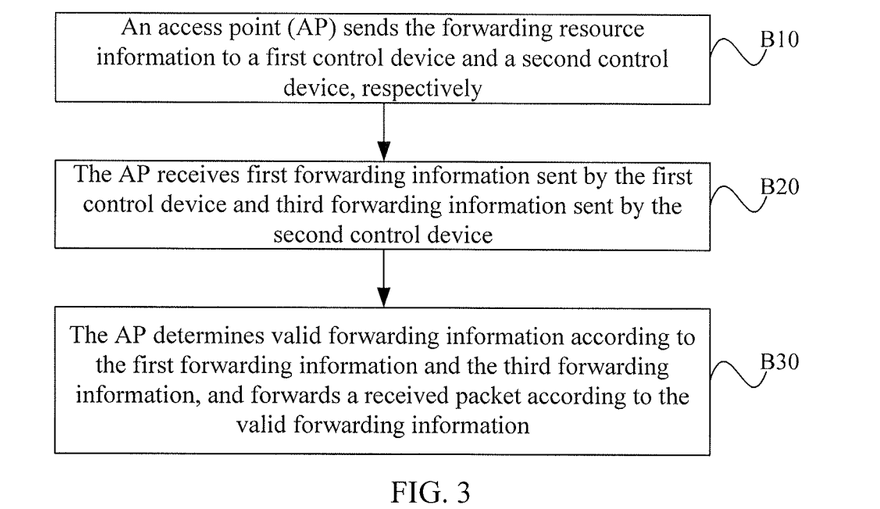
FIG. 3 is a flow chart of a method for controlling a network path according to another embodiment of the present invention.

FIG. 3 is a flow chart of a method for controlling a network path according to another embodiment of the present invention. As shown in FIG. 3, the method for controlling a network path provided in this embodiment may cooperate with the embodiment shown in FIG. 1, and no further details about the specific implementation process are given here. The method for controlling a network path provided in this embodiment specifically includes:

Step B10: An access point (AP) sends forwarding resource information to a first control device and a second control device, respectively;

Step B20: The AP receives first forwarding information sent by the first control device and third forwarding information sent by the second control device;

Step B30: The AP determines valid forwarding information according to the first forwarding information and the third forwarding information, and forwards a received packet according to the valid forwarding information.

Specifically, the first control device and the second control device are respectively control devices for managing the AP, both the first control device and the second control device generate forwarding information for the AP and send the forwarding information to the AP. When the first control device is a master control device of the AP, the second control device may be a standby control device of the AP, the first control device computes a path and generates first forwarding information for the AP, and the second control device generates third forwarding information for the AP. The AP may determine valid forwarding information in many ways, for example, a priority of the first forwarding information is pre-configured in the first control device, a priority of the third forwarding information is pre-configured in the second control device, and priorities are carried in forwarding information and issued to the first AP, so that the first AP can determine valid forwarding information according to the priorities. A priority of each control device may also be pre-configured in the first AP, and the first AP determines valid forwarding information according to priorities when receiving a plurality of forwarding information. The first AP may also determine valid forwarding information according to a preset policy, such as an IP address of a control device, where a larger IP address has a higher priority.

In the method for controlling a network path provided in this embodiment, the AP sends the forwarding resource information to the first control device and the second control device, respectively, receives the first forwarding information sent by the first control device and the third forwarding information sent by the second control device, determines valid forwarding information according to the first forwarding information and the third forwarding information, and forwards a received packet according to the valid forwarding information. According to the setting of the first control device and the second device, a control plane of the AP is centralized in a control device, the first control device and the second control device respectively generate forwarding information for the AP, and the AP only forwards packets according to the received forwarding information. Therefore, performing configuration and maintaining for each AP in a network can be avoided, the network structure is simplified, and the manageability of the network is improved.

In this embodiment, the first forwarding information includes a first priority to the AP from the first control device; the third forwarding information includes a third priority to the AP from the second control device; and the determining, by the AP, the valid forwarding information according to the first forwarding information and the third forwarding information, which is in step B30, may specifically include:

the AP selects the first forwarding information as the valid forwarding information, when the first priority is higher than the third priority.

Specifically, a priority may be set according to a running condition of each device in the network and a link condition, with the setting of the priority, the AP may select forwarding information according to the priority sequence, so as to improve reliability of selecting the forwarding information.

In this embodiment, the determining, by the AP, the valid forwarding information according to the first forwarding information and the third forwarding information, which is in step B30, specifically includes: the AP selects one of the first forwarding information and the third forwarding information as the valid forwarding information, according to a preset policy.

The AP may also select forwarding information according to a preset policy, so as to improve flexibility of selecting the forwarding information.

In this embodiment, the sending, by the access point (AP), the forwarding resource information to the first control device and the second control device respectively, which is in Step B10, may specifically include:

the AP sends the forwarding resource information to the first control device, according to a received first forwarding resource information requiring request sent by the first control device;

the AP sends the forwarding resource information to the second control device, according to a received second forwarding resource information acquiring request sent by the second control device.

In practical applications, the AP may also actively report the forwarding resource information to the first control device and the second control device.

Figure 4:
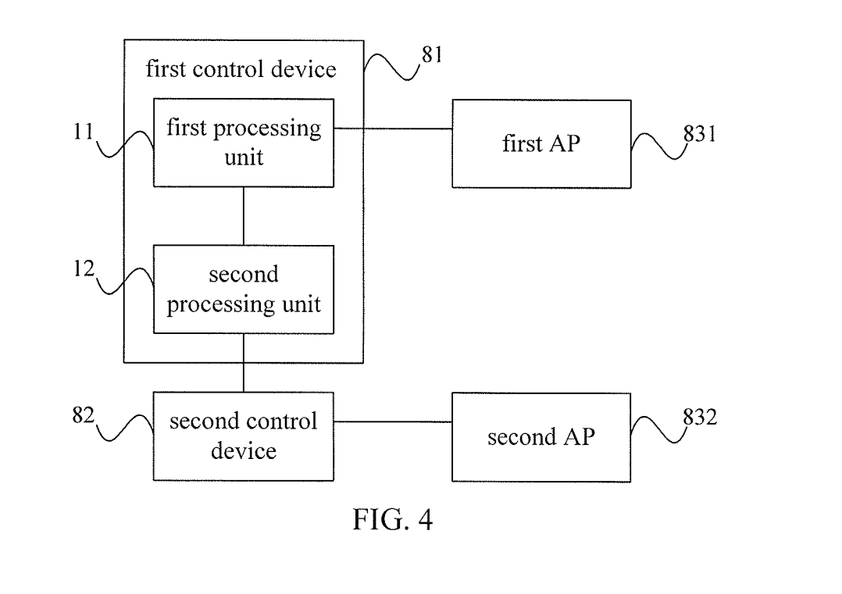
FIG. 4 is a schematic structural diagram of a first control device according to an embodiment of the present invention.

FIG. 4 is a schematic structural diagram of a first control device according to an embodiment of the present invention. As shown in FIG. 4, the first control device 81 provided in this embodiment may specifically implement each step of the method for controlling a network path provided in the embodiment shown in FIG. 1, and no further details will be given here. The first control device 81 provided in this embodiment specifically includes a first processing unit 11 and a second processing unit 12. The first processing unit 11 is configured to generate path information for a first AP 831 according to network topology information, and generate first forwarding information for the first AP 831 according to acquired forwarding resource information of the first AP 831 and the path information, and send the first forwarding information to the first AP 831. The second processing unit 12 is configured to determine that a second AP 832 which is not managed by the first control device is included in the path information, send the path information to a second control device 82 for managing the second AP 832, so that the second control device 82 generates second forwarding information of the second AP 832 according to the path information and the acquired forwarding resource information of the second AP 832, and sends the second forwarding information to the second AP 832.

In the first control device 81 provided in this embodiment, the first processing unit 11 generates the path information for the first AP 831 according to the network topology information, and generates the first forwarding information for the first AP 831 according to the acquired forwarding resource information of the first AP 831 and the path information, and sends the first forwarding information to the first AP 831. The second processing unit 12 determines that the second AP 832 which is not managed by the first control device is included in the path information, sends the path information to the second control device 82 for managing the second AP 832, so that the second control device 82 generates the second forwarding information of the second AP 832 according to the path information and the acquired forwarding resource information of the second AP 832, and sends the second forwarding information to the second AP 832. According to the setting of the first control device 81, a control plane of the first AP 831 is centralized in the first control device, the first control device 81 performs path computation for the first AP 831 which is managed by the first control device, generates and issues first forwarding information to the first AP 831, and the first AP 831 doesn't perform path computation but only forwards packets according to the received first forwarding information. Moreover, according to the cooperation between the second control device 82 and the first control device 81, the generation and issuing of the second forwarding information of the second AP 832 which is not managed by the first control device 81 is realized. Therefore, performing configuration and maintaining for each AP in a network can be avoided, the network structure is simplified, and the manageability of the network is improved.

Figure 5:
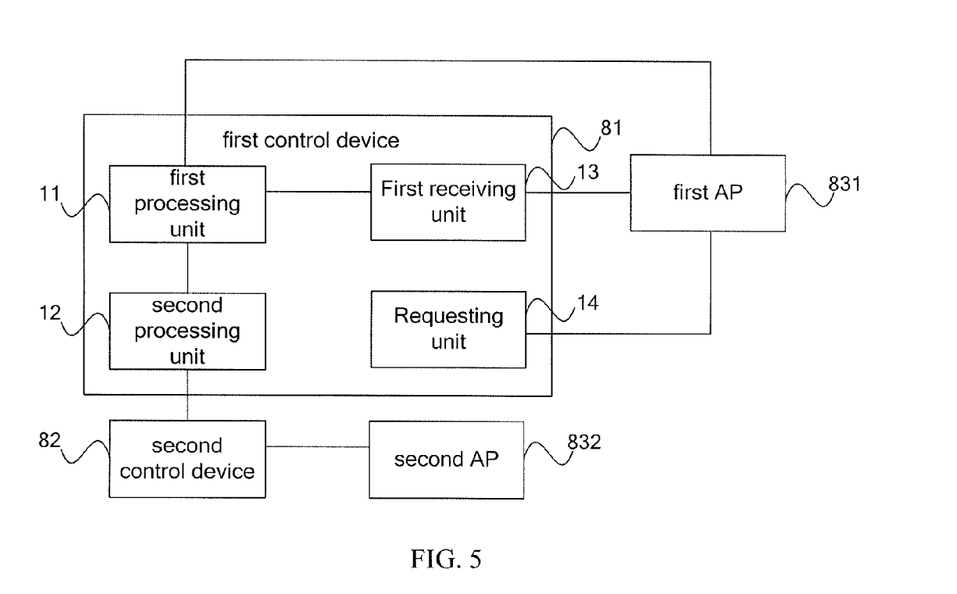
FIG. 5 is a schematic structural diagram of a first control device according to another embodiment of the present invention.

FIG. 5 is a schematic structural diagram of a first control device according to another embodiment of the present invention. As shown in FIG. 5, in this embodiment, the second processing unit 12 is further configured to determine that the second AP 832 which is not managed by the first control device 81 is included in the path information, when the second AP 832 is included in the path information and the first control device 81 has no forwarding resource information of the second AP 832.

In this embodiment, the path information includes bidirectional path information between the first control device 81 and the first AP 831, and/or bidirectional path information between the second control device 82 and the first AP 831.

In this embodiment, the first control device 81 may also include a first receiving unit 13, where the first receiving unit 13 is configured to receive the forwarding resource information sent by the first AP 831.

In this embodiment, the first control device 81 may also include a requesting unit 14, where the requesting unit 14 is configured to request the forwarding resource information from the first AP 831.

Figure 6:
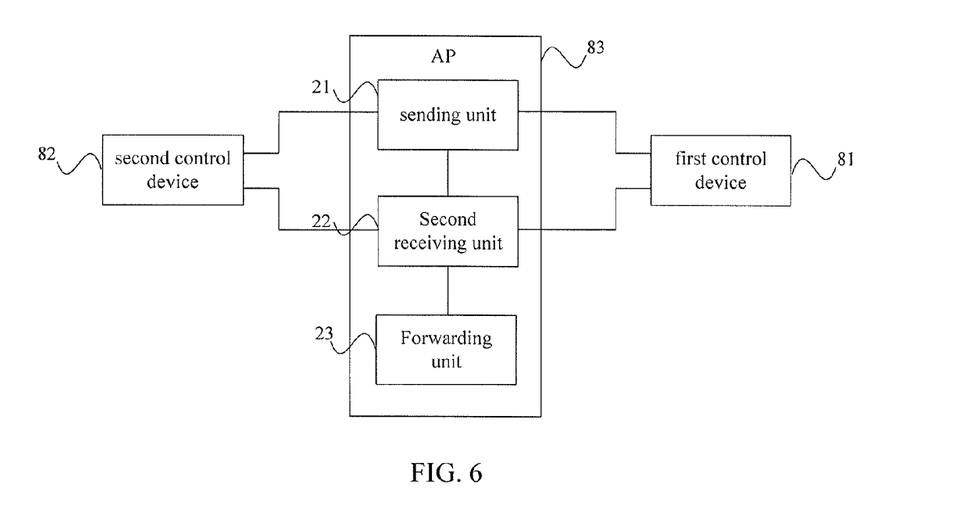
FIG. 6 is a schematic structural diagram of an access point according to an embodiment of the present invention.

FIG. 6 is a schematic structural diagram of an access point according to an embodiment of the present invention. As shown in FIG. 6, the access point (AP) 83 provided in this embodiment may specifically implement each step of the method for controlling a network path provided in the embodiment shown in FIG. 2, and no further details will be given here. The access point (AP) 83 provided in this embodiment specifically includes a sending unit 21, a second receiving unit 22 and a forwarding unit 23. The sending unit 21 is configured to send forwarding resource information to a first control device 81 and a second control device 82, respectively. The second receiving unit 22 is configured to receive first forwarding information sent by the first control device 81 and third forwarding information sent by the second control device 82. The forwarding unit 23 is configured to determine valid forwarding information according to the first forwarding information and the third forwarding information, and forward a received packet according to the valid forwarding information.

In the access point (AP) 83 provided in this embodiment, the sending unit 21 sends the forwarding resource information to the first control device 81 and the second control device 82, respectively. The second receiving unit 22 receives the first forwarding information sent by the first control device 81 and the third forwarding information sent by the second control device 82. The forwarding unit 23 determines the valid forwarding information according to the first forwarding information and the third forwarding information, and forwards the received packet according to the valid forwarding information. According to the setting of the first control device 81 and the second device 82, a control plane of the AP 83 is centralized in a control device, the first control device 81 and the second control device 82 respectively generate forwarding information for the AP 83, and the AP 83 only forwards packets according to the received forwarding information. Therefore, performing configuration and maintaining for each AP 83 in a network can be avoided, the network structure is simplified, and the manageability of the network is improved.

In this embodiment, the first forwarding information includes a first priority to the AP 83 from the first control device 81; the third forwarding information includes a third priority to the AP 83 from the second control device 82; the forwarding unit 23 is further configured to select the first forwarding information as the valid forwarding information, when the first priority is higher than the third priority.

In this embodiment, the forwarding unit 23 is further configured to select one of the first forwarding information and the third forwarding information as the valid forwarding information, according to a preset policy.

In this embodiment, the second receiving unit 22 is configured to send the forwarding resource information to the first control device 81, according to a received first forwarding resource information acquiring request sent by the first control device 81; and send the forwarding resource information to the second control device 82, according to a received second forwarding resource information acquiring request sent by the second control device 82.

Figure 7:
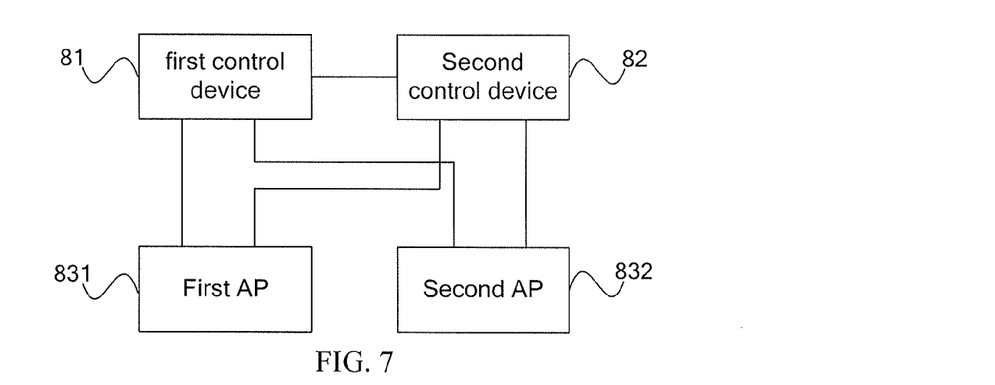
FIG. 7 is a schematic structural diagram of a system for controlling a network path according to an embodiment of the present invention.

FIG. 7 is a schematic structural diagram of a system for controlling a network path according to an embodiment of the present invention. As shown, the system for controlling a network path provided in this embodiment specifically includes a first control device 81, a second control device 82, a first access point (AP) 831 and a second AP 832. The first control device 81 is configured to generate path information for a first AP 831 according to network topology information, generate first forwarding information for the first AP 831 according to acquired forwarding resource information of the first AP 831 and the path information, send the first forwarding information to the first AP 831, determine that a second AP 832 which is not managed by the first control device 81 is included in the path information, and send the path information to a second control device 82 for managing the second AP 832, so that the second control device 82 generates second forwarding information of the second AP 832 according to the path information and the acquired forwarding resource information of the second AP 832, and sends the second forwarding information to the second AP 832. The first AP 831 is configured to send the forwarding resource information to the first control device 81 and the second control device 82, respectively, receive the first forwarding information sent by the first control device 81 and the third forwarding information sent by the second control device 82, determine valid forwarding information according to the first forwarding information and the third forwarding information, and forward a received packet according to the valid forwarding information.

In the system for controlling a network path provided in this embodiment, according to the setting of the first control device 81 and the second device 82, a control plane of the first AP 83 is centralized in the first control device 81 and the second device 82, the first control device 81 performs path computation for the first AP 831 which is managed by the first control device, generates first forwarding information for the first AP 831 and issues the first forwarding information to the first AP 831, the second device 82 generates third forwarding information for the first AP 831 managed by the second device 82. The first AP 831 doesn't perform path computation but only guides packet forwarding according to the received first forwarding information and third forwarding information. Moreover, the second control device 82 may cooperate with the first control device 81 to generate and issue the second forwarding information of the second AP 832 which is not managed by the first control device 81. Therefore, performing configuration and maintaining for each AP in a network can be avoided, the network structure is simplified, and the manageability of the network is improved.

Figure 8:
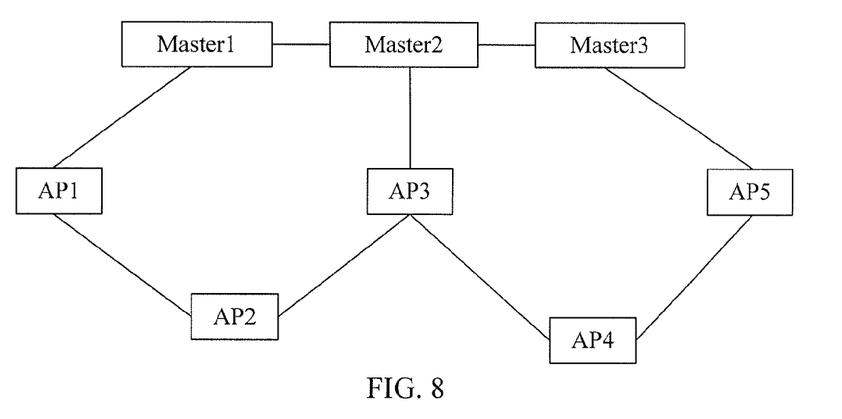
FIG. 8 is a schematic structural diagram of a network topology according to an embodiment of the present invention.

FIG. 8 is a schematic structural diagram of a network topology according to an embodiment of the present invention. In the network topology structure shown in FIG. 8, there are 8 routers or switches, and three of them are control devices, i.e., Master 1, Master 2 and Master 3, others are APs, i.e., AP1, AP2, AP3, AP4 and AP5. The working process of the system for controlling a network path provided in this embodiment is hereinafter described in details by taking the following cases as examples, that is, Master 1 and Master 2 are respectively a master control device and a standby control device of the AP2, Master 1 is a standby control device of the AP1, and Master 2 is a standby control device of the AP3.

The AP1 sends forwarding resource information to the Master 1, the AP3 sends forwarding resource information to the Master 2, and the AP2 sends forwarding resource information to the Master 1 and the Master 2, respectively.

The Master 1 computes path information for the AP2 according to network topology information, and the path information may include, but not limited to, first path information and second path information. The first path information is AP2→AP1→Master 1, and the second path information is AP2→AP3→Master 2. A representation form of the path information may be different depending on different network protocols on which a network is based. For example, in LSP (Label Switch Path, label switched path) forwarding, a form of the path information may be (LSRID of the AP2)→(LSRID of the AP1)→(LSRID of the Master 1). The Master 1 synchronizes the above two pieces of the path information to the Master 2.

The Master 1 generates forwarding information for the AP2 according to the first path information and forwarding resource information of the AP2, and the Master 1 generates forwarding information for the AP1 according to the first path information and forwarding resource information of the AP1. The Master 2 generates forwarding information for the AP2 according to the second path information and forwarding resource information of the AP2, and the Master 2 generates forwarding information for the AP3 according to the second path information and forwarding resource information of the AP3. The Master 1 and Master 2 respectively send forwarding information corresponding to the AP2 to the AP2, the Master 1 sends forwarding information corresponding to the AP1 to the AP1, the Master 2 sends forwarding information corresponding to the AP3 to the AP3, the AP2 may determine valid forwarding information according to received forwarding information, and forward the received packets according to the valid forwarding information.

Of course, multiple servers may be added to implement a control device, during particular implementation, a server serving as the control device doesn't serve as a node in path information.

In the system for controlling a network path provided in this embodiment, when there are a plurality of control devices in the network, after network virtualization, the control plane is not one but several. The whole virtual network actually presents a plurality of virtual control planes, and each control device may be considered as a virtual control plane. The AP node in the virtual network may freely select control devices providing services for the AP itself. Since the AP can freely select control devices providing services for the AP itself, a plurality of complex networking mode such as tangent ring networking, intersecting ring networking, and ring-in-ring networking can be realized, and when the master control device has faults or is upgraded, it is convenient to hand over services on the master control device to the standby control device, so that the whole network service can be uninterruptedly.

It should be noted that, the first and the second control devices, the first to the third APs, the first to the third forwarding information are only used for distinguishing and are not intended to limit the sequence.

It should be appreciated by persons skilled in the art that, all or a part of the steps in the method of the above embodiments may be completed by relevant hardware under the instruction of a program, and the program may be stored in a computer readable storage medium, when the program is executed, the steps in the method of the above embodiments are performed; the storage medium includes various media capable of storing program codes, such as a read only memory (ROM)/random access memory (RAM), a floppy disk, or an optical disk and the like.

Finally, it should be noted that the above embodiments are merely provided for describing the technical solutions of the present invention, but not intended to limit the present invention. It should be understood by persons skilled in the art that although the present invention has been described in detail with reference to the foregoing embodiments, modifications can be made to the technical solutions described in the foregoing embodiments, or equivalent replacements can be made to partial or all technical features in the technical solutions; however, such modifications or replacements do not cause the essence of corresponding technical solutions to depart from the scope of the embodiments of the present invention.

What is claimed is:

1. A method for controlling a network path, comprising:
generating, by a first control device, path information for a first access point (AP) according to network topology information, and generating first forwarding information for the first AP according to acquired forwarding resource information of the first AP and the path information, and sending the first forwarding information to the first AP, wherein the forwarding resource information of the first AP comprises a label space, a media access control (MAC) address and port information of the first AP;

determining, by the first control device, that a second AP which is not managed by the first control device is included in the path information, sending the path information to a second control device for managing the second AP; and wherein the determining, by the first control device, that the second AP which is not managed by the first control device is included in the path information comprises: determining, by the first control device, that a second AP which is not managed by the first control device is included in the path information, when the second AP is included in the path information and the first control device has no forwarding resource information of the second AP.

2. The method for controlling a network path according to claim 1, wherein the path information comprises bidirectional path information between the first control device and the first AP and bidirectional path information between the second control device and the first AP.

3. The method for controlling a network path according to claim 1, wherein the path information comprises bidirectional path information between the first control device and the first AP.

4. The method for controlling a network path according to claim 1, wherein the path information comprises bidirectional path information between the second control device and the first AP.

5. The method for controlling a network path according to claim 1, wherein before the generating, by the first control device, the path information for the first AP according to the network topology information, the method further comprises:
receiving, by the first control device, the forwarding resource information sent by the first AP.

6. The method for controlling a network path according to claim 5, wherein before the receiving, by the first control device, the forwarding resource information sent by the first AP, the method further comprises:
requesting, by the first control device, the forwarding resource information from the first AP.

7. A first control device, comprising:
a hardware; and
a non-transitory computer-readable storage medium including computer-executable instructions executed by the hardware to perform a method that comprises:
generating path information for a first access point (AP) according to network topology information, and generating first forwarding information for the first AP according to acquired forwarding resource information of the first AP and the path information, and sending the first forwarding information to the first AP, wherein the forwarding resource information of the first AP comprises a label space, a media access control (MAC) address and port information of the first AP;
determining that a second AP which is not managed by the first control device is included in the path information, and sending the path information to a second control device for managing the second AP; and
wherein determining that the second AP which is not managed by the first control device is included in the path information comprises: determining that a second AP which is not managed by the first control device is included in the path information, when the second AP is included in the path information and the first control device has no forwarding resource information of the second AP.

8. The first control device according to claim 7, wherein the path information comprises bidirectional path information between the first control device and the first AP and bidirectional path information between the second control device and the first AP.

9. The first control device according to claim 7, wherein the path information comprises bidirectional path information between the first control device and the first AP.

10. The first control device according to claim 7, wherein the path information comprises bidirectional path information between the second control device and the first AP.

11. The first control device according to claim 7, wherein before generating the path information for the first AP according to the network topology information, the method further comprises:
receiving the forwarding resource information sent by the first AP.

12. The first control device according to claim 11, wherein before receiving the forwarding resource information sent by the first AP, the method further comprises:
requesting the forwarding resource information from the first AP.

13. An access point (AP), comprising:
a hardware; and
a non-transitory computer-readable storage medium including computer-executable instructions executed by the hardware to perform a method that comprises:
sending forwarding resource information to a first control device and a second control device, respectively, wherein the forwarding resource information of the first AP comprises a label space, a media access control (MAC) address and port information of the first AP;
receiving first forwarding information sent by the first control device and second forwarding information sent by the second control device;
determining valid forwarding information according to the first forwarding information and the second forwarding information, and forwarding a received packet according to the valid forwarding information;
wherein the first forwarding information comprises a first priority that is delivered by the first control device to the AP; the second forwarding information comprises a second priority that is delivered by the second control device to the AP; and
the method further comprises: selecting the first forwarding information as the valid forwarding information, when the first priority is higher than the second priority, wherein the first forwarding information is based on the forwarding resource information sent to the first control device and the second forwarding information is based on the forwarding resource information sent to the second control device.

14. The access point according to claim 13, wherein the method further comprises: selecting one of the first forwarding information and the second forwarding information as the valid forwarding information, according to a preset policy.

15. The access point according to claim 13, wherein:
sending the forwarding resource information to the first control device and the second control device, respectively comprises:
sending the forwarding resource information to the first control device, according to a received first forwarding resource information acquiring request which is sent by the first control device; and sending the forwarding resource information to the second control device, according to a received second forwarding resource information acquiring request which is sent by the second control device.

* * * * *

UNITED STATES PATENT AND TRADEMARK OFFICE
CERTIFICATE OF CORRECTION

PATENT NO. : 9,755,909 B2  
APPLICATION NO. : 14/575386  
DATED : September 5, 2017  
INVENTOR(S) : Xiong et al.

It is certified that error appears in the above-identified patent and that said Letters Patent is hereby corrected as shown below:

On the Title Page

Item (72) Inventors, should read:  
City/country for inventor Xiong should read -- Shenzhen, Guangdong (CN) --.  
City/country for inventor Wu should read -- Shenzhen, Guangdong (CN) --.  
City/country for inventor Yan should read -- Shenzhen, Guangdong (CN) --.  
City/country for inventor Hu should read -- Shenzhen, Guangdong (CN) --.

Signed and Sealed this  
Sixth Day of February, 2018

Joseph Matal  
*Performing the Functions and Duties of the*  
*Under Secretary of Commerce for Intellectual Property and*  
*Director of the United States Patent and Trademark Office*